Sept. 16, 1958     A. L. BARRETT     2,852,127
PORTABLE EXTENSIBLE CONVEYOR
Original Filed Nov. 26, 1954     2 Sheets-Sheet 1
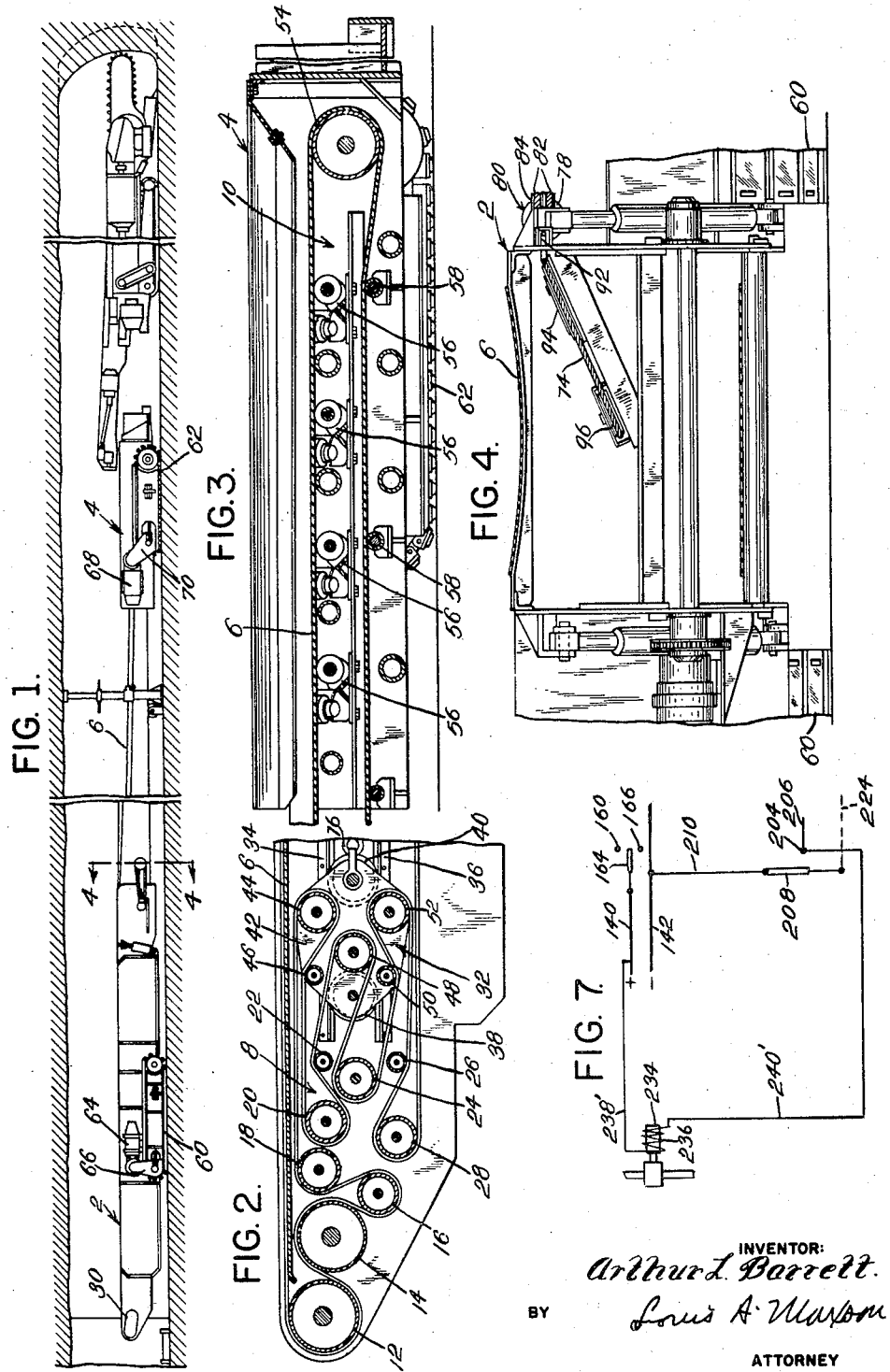

Sept. 16, 1958  A. L. BARRETT  2,852,127
PORTABLE EXTENSIBLE CONVEYOR
Original Filed Nov. 26, 1954  2 Sheets-Sheet 2

INVENTOR:
Arthur L. Barrett.
BY Louis A. Maxson.
ATTORNEY

_United States Patent Office_

2,852,127
Patented Sept. 16, 1958

2,852,127

PORTABLE EXTENSIBLE CONVEYOR

Arthur L. Barrett, Franklin, Pa., assignor to Joy Manufacturing Company, Pittsburgh, Pa., a corporation of Pennsylvania Continuation of application Serial No. 471,297, November 26, 1954. This application April 18, 1955, Serial No. 501,812

8 Claims. (Cl. 198—139)

This invention relates to portable extensible belt conveyors, and particularly to conveyors such as are shown in the George Baechli application, Serial No. 225,791, filed May 11, 1951, now abandoned, and in the application of Henry J. Yaggi, Serial No. 353,079, filed May 5, 1953, now abandoned, both of which applications are assigned to the assignee of this present application and invention. The invention disclosed and claimed herein constitutes an improvement of the apparatus disclosed in the applications identified above.

Portable extensible belt conveyors of the character mentioned include drive and take-up buggies and an extensible belt portion extending between the buggies, such portion being elongated as the take-up buggy moves away from the drive buggy and being shortened as the take-up buggy moves back toward the drive buggy. It is important that the belt be maintained reasonably taut as the take-up buggy is moved toward the drive buggy, and the principal object of the present invention is to provide an improved arrangement by which the avoidance of slack in the belt at such times shall be precluded. In a preferred apparatus of the kind mentioned the tension of the belt is maintained by hydraulic pressure operated means, and a more specific object of the present invention is to provide an improved arrangement whereby the pressure in the hydraulic system shall be augmented during the periods when the take-up buggy is moving toward the drive buggy.

These and other objects are accomplished by means of additional pressure controlling means for the hydraulic system, controlled for example by the control means for the take-up buggy traction mechanism.

In the drawings:

Fig. 1 is a view in elevation of apparatus embodying the invention, this view being a vertical section through a mine to show the apparatus in position to receive mineral from a continuous miner.

Fig. 2 is a longitudinal section through the discharge end of the drive buggy, showing the means of the drive buggy to engage, support and drive a conveyor belt and showing the adjustable belt take-up means.

Fig. 3 is a longitudinal section through the mineral-receiving end of the take-up buggy, showing the means thereon to engage and support the conveyor belt.

Fig. 4 is a view in transverse vertical section substantially on line 4—4 of Fig. 1 and on an enlarged scale.

Fig. 5 is a schematic showing of the means to engage, drive and support the conveyor belt and of the belt take-up means as connected to be operated and controlled by the means to move the take-up means.

Fig. 6 is a schematic view showing the hydraulic circuit for the belt take-up means and the control circuit for the motor which drives the pump in said hydraulic circuit; and Fig. 7 is a fragmentary view, similar to portions of Fig. 6, showing a modification.

Referring now in detail to the drawings, it will be understood that the apparatus comprises a drive buggy 2, a take-up buggy 4, and a conveyor belt 6 carried by the two buggies on belt engaging and supporting means indicated generally at 8 for the drive buggy and at 10 for the take-up buggy.

More specifically, the belt engaging and supporting means 8 on the drive buggy includes a plurality of rotatably mounted belt pulleys 12, 14, 16, 18, 20, 22, 24, 26 and 28, the belt 6 being looped around the several pulleys in a manner which will be readily understood by those skilled in the art. The pulleys 12 and 14 are preferably both power driven and thus supply the power to drive the belt. Pulleys 12 and 14 are connected for simultaneous rotation by any conventional gear drive mounted on the drive buggy and indicated generally at 30 of Fig. 1. The drive means for the pulleys 12 and 14 need not be discussed here, as such drives are well known.

Adjustable belt take-up means is provided. In the embodiment shown in the drawings, the take-up means is mounted on the drive buggy and comprises a belt cluster 32 mounted for longitudinal movement along rails 34 and 36 by means of wheels 38 and 40, the rails 34 and 36 being secured to the drive buggy frame, and the wheels 38 and 40 being rotatably mounted at opposite ends of a moving carriage 42. Wheels 38 and 40 normally ride on the lower rail 36 and are restrained against upward displacement by the upper rail 34.

The belt cluster 32 comprises a plurality of rotatably mounted belt pulleys 44, 46, 48, 50 and 52, the belt being wrapped around these pulleys and the pulleys of the belt engaging and supporting means 8 in a manner clearly shown in Fig. 2 and which will be readily understood by those skilled in the art, and providing six runs between stationary and translatable pulleys or idler rollers.

Referring now to the take-up buggy end of the apparatus, the belt engaging and supporting means 10 there shown preferably comprises an end idler pulley 54, a plurality of troughing idlers indicated generally at 56, and a plurality of rolls 58 to support the return run of the belt. It will of course be understood that both buggies are mounted for movement on any suitable ground-engaging means, such as the track-laying devices shown at 60 on the drive buggy and 62 on the take-up buggy.

There is a track-laying device 60 at each side of the drive buggy 2 (see Fig. 4), and similarly, a track-laying device 62 at each side of the take-up buggy 4, one of these being shown in Fig. 1 and the other in Fig. 3. The track-laying devices may conveniently be individually driven, as for example by electric motors. One of the drive motors for the track-laying devices of drive buggy 2 is shown at 64 in Fig. 1, being connected with its associated track-laying device through conventional gear reduction and chain drive means indicated generally at 66. A drive motor for one of the track-laying devices 62 of the take-up buggy is shown at 68 in Fig. 1, being connected with its associated track-laying device by suitable conventional gear reduction and chain drive means indicated generally at 70.

Reference is made above to adjustable belt take-up means, this means comprising the belt cluster 32 supported by the moving carriage 42. Means are provided to move the take-up means in a direction to take up belt slack. In the embodiment shown, the moving carriage 42 is moved to the right as seen in Figs. 2 and 5 in order to take up belt slack and to store belt in the event that there is extended movement of the take-up buggy 4 toward the drive buggy 2. To this end, a cable section indicated generally at 72 is connected to the moving carriage 42, and to this a pull is suitably applied in order at all times either to keep the belt 6 in tension or to apply a sufficient force to the moving carriage 42 to take up belt slack as such slack occurs.

More specifically, cable section 72 comprises a cable 74 having a loop 76 engaging the moving carriage 42 at its one end, the other end of cable 74 being secured to a stationary point such as cylinder 78 of a hydraulic cylinder and piston mechanism indicated generally at 80. A plurality, here shown as two, of cable sheaves 82 form part of a multiple (double) block 84. Another multiple (triple) block 86 includes sheaves 88. The multiple block 84 is stationary with respect to the cylinder 78, and to that end may conveniently be secured to one end of the cylinder as shown schematically in Fig. 5. The multiple block 86 is carried by a piston rod 89 of the cylinder and piston mechanism 80. Other sheaves 90, 92, 94 and 96 serve to guide the cable 74 in its movement into and out of the cable storage system comprising the blocks 84 and 86.

Means are provided to supply hydraulic fluid to the cylinder and piston mechanism 80. Mechanism 80 may conveniently be a single-acting hydraulic jack, hydraulic fluid being supplied to extend the jack to apply tension to the cable 74 and, through moving carriage 42, to the belt 6, the force to collapse the jack mechanism 80 coming from relative movement between the buggies 2 and 4 increasing the distance between the buggies and therefore requiring additional belting between the buggies, which additional belting must of course come from the belt storage system. It will be understood by those skilled in the art that the jack mechanism 80 will be completely collapsed when the buggies 2 and 4 are separated as far as possible for a given length of belting carried by them, and that the jack mechanism 80 will be fully extended when the buggies 2 and 4 are as close together as possible without slack for a given length of belting.

In order to accomplish the extension of the jack mechanism 80, a hydraulic fluid line 98 is connected to supply fluid to, and vent fluid from, one end of cylinder 78, namely the right end as seen in Figs. 5 and 6. Fluid line 98 is connected, as shown, with control section 100 of a control valve structure 101, shown as consisting of two control or valve sections, namely the section 100 referred to and another section 102, a supply section 104, and a discharge section 106. Supply section 104 is connected with one end of a fluid pressure line 108 in which there is provided a check valve 110 opening toward the supply section. The other end of pressure line 108 is connected with the discharge of a hydraulic pump 112. The intake of pump 112 receives fluid from a tank or reservoir 114 by way of a suction line 116.

The hydraulic control valve referred to above and having the control sections 100 and 102 need not be described in detail here, inasmuch as numerous such valves are available in the open market and are well understood by those skilled in the art. It will suffice here to point out that section 102 is provided with a handle 118 and section 100 is provided with a handle 120. Exhaust fluid from the section 106 may pass freely to conduits 128 and 130 and back to the tank or reservoir 114, and fluid at operating pressure may pass to conduit 126 when the valves of valve sections 100 and 102 are in neutral position, section box 106 being of a conventional type having provision for pressure fluid delivery beyond the same to conduit 126. So long as handle 118 of section 102 is in its neutral position, hydraulic fluid flows to the section 100, and on past it and unless and until handle 120 is moved out of its neutral position the pressure fluid will be available in the line 126 to a valve 124 either for venting or for driving a motor M provided as a source of power to wind up belt to be removed from the apparatus. Inasmuch as the hydraulic cylinder and piston mechanism 80 is a single-acting jack, only one of the discharge outlets of valve section 100 is connected for use, and only one operating position of handle 120 is effective. Any suitable mechanism, such as the pivoted dog shown schematically at 122 may be used to keep the handle 120 in the single effective operating position.

The entire hydraulic system shown in Fig. 6 need not be described here. It has been indicated that the discharge section 106 is connected with a valve section 124, which controls a motor M by means of a fluid line 126. In one operating position of valve section 124, fluid is discharged freely to fluid line 128, which connects with reservoir 114 by way of return line 130. Another fluid line 132 connects the line 98 with the return line 130. Fluid line 132 is provided with a manually opened cut-off valve 134 and an automatic pressure relief valve 136. With the cut-off valve 134 open, fluid may flow from line 98 to the return line 130 through fluid line 132, providing the pressure is sufficient to force open the pressure relief valve 136. Relief valve 136 is set to maintain a pressure which will insure the belt tension desired during times when the belt is being payed out, or is neither being payed out nor wound in.

A suitable drive motor 138 is connected to drive the hydraulic pump 112. In the embodiment shown, motor 138 is indicated schematically as being an electric motor. Any suitable source of electric power is connected to control means to supply power to the electric motor 138. The same power source is likewise connected to suitable control means to supply power to the drive motors 68 for the track-laying devices 62 of the take-up buggy 4. It will be understood that the schematic showing of Fig. 6 indicates one drive motor 68, which represents the traction motor means to drive the take-up buggy. In actual practice, the motor 68 shown schematically in Fig. 6, may be one, two, or any other desired number of motors.

A preferred form of power for mine installations is D. C. power, here represented as having a positive line 140, and a negative line 142.

Control means for motor 138 are indicated generally at 144 and include a pressure switch 146 and a relay 148. Pressure switch 146 includes a pressure chamber 150 which is always subjected to the pressure in the fluid pressure line 98, being connected therewith by a fluid line 152. A diaphragm 154 in the pressure chamber 150 is connected with a movable contact 156. Movable contact 156 has two operating positions, one of which is shown in Fig. 6. In its other operating position, movable contact 156 engages a fixed contact 158 which is electrically connected with another fixed contact 160 by means of a conductor 162. A movable contact 164 electrically connected with the positive power line 140 is movable into either one of two operating positions, in one of which fixed contact 160 is electrically connected with the positive line 140, and in the other of which positive line 140 is connected with a fixed contact 166. Movable contact 156 is connected by a conductor 168 with one end of the operating coil 170 of relay 148. A conductor 172 connects fixed contact 166 with conductor 168. The other end of coil 170 is connected with the negative power line 142 by means of a conductor 174.

A branch conductor 176 is connected at its one end with positive line 140, and at its other end divides into two branches 178 and 180. Branch 178 is connected with a stationary contact 182 of relay 148. Relay 148 has a movable contact 184 which is adapted to complete a circuit between the stationary contact 182 and another stationary contact 186. Contact 186 has connected to it one end of a conductor 188, the other end of which is connected with pump-driving motor 138. A conductor 190 connects motor 138 with the negative line 142.

Additional control means for the motor 138 are provided and include a relay 192. Relay 192 is provided in order to bypass the pressure switch 146, and toward that end includes one stationary contact 194 connected to the conductor 180 referred to above, and another stationary contact 196 connected by a conductor 198 to the conductor 172 referred to above. A movable contact 200 of relay 192 is adapted to complete a circuit between contacts 194 and 196.

One end of the operating coil 201 of relay 192 is connected with conductor 180 by a conductor 202, and the other end of the coil 201 is connected to a stationary contact 204 by means of a conductor 206. A movable contact or switch 208 is connected with negative line 142 by means of a conductor 210, and is adapted in its closed position to engage stationary contact 204.

Control means are provided for the traction motor means of the take-up buggy, these control means including a conventional motor controller 212 having an operating handle 214 movable into forward and reverse positions indicated by the letters F and R respectively. It is assumed that when the handle 214 is in the reverse operating position R controller 212 connects motor 68 to move the take-up buggy toward the drive buggy.

Controller 212 is connected with the take-up buggy traction motor means, shown schematically in Fig. 6 as a single motor 68, by means of conductors 216 and 218. Controller 212 is connected with the power supply by means of conductors 220 and 222; conductor 220 is connected to the positive line by way of conductors 178 and 176, while conductor 222 is connected to the negative line by means of conductor 174.

An interlock is provided connecting the traction motor control means with the additional control means for the belt take-up moving means. This interlock may be any conventional mechanical interlock, and is shown schematically by the dotted line 224 connecting the movable contact 208 with the motor controller handle 214 in such a manner that movement of the controller handle to connect traction motor means 68 in reverse at the same time moves contact 208 into engagement with contact 204.

It will be appreciated that closing of the switch 208 may be effected by some other element whose position is shifted whenever the take-up buggy is driven, or to be driven, backwards. For example, a suitable operative connection can be provided controlled by any rotating element associated with the drive of the take-up buggy, whereby the instant the take-up buggy starts to move back toward the drive buggy the switch 208 will be caused to close. Friction actuated operating mechanism for causing closing of a switch when a rotating part is turned in a desired direction is well known in the art and therefore illustration of this type of arrangement is unnecessary. The connection 224 between the handle 214 and the switch 208 may thus be considered exemplary of other means for causing the switch 208 to close when the take-up buggy is started in a direction toward the drive buggy.

During the time when belt must be wound in by reason of the movement of the take-up buggy toward the drive buggy the pressure existing within the cylinder 78, with the apparatus as so far described, would be determined by the setting of the pressure relief valve 136 and, though the pump driving motor 138 may drive the pump 112 throughout the period of movement of the take-up buggy toward the drive buggy, the tension of the belt would be only such as the pressure determined by the relief valve 136 would establish. It would be advantageous, however, to increase this pressure during the approach of the take-up buggy to the drive buggy, and there is accordingly provided as shown in Fig. 6 means for insuring the maintenance of a higher pressure in the line 98 at that time. Such a means could take the form of an arrangement for increasing the loading of the relief valve 136 or a means for interrupting the flow of fluid through the relief valve 136 and necessitating relief through another relief connection from the line 98 to the vent line 132, such other relief connection having associated with it a relief valve set at an appropriately higher relief pressure. This latter arrangement is shown in Fig. 6, in which it will be noted that a fluid conduit 226 communicates with the portion of the conduit 132 between the manually operable control valve 134 and the relief valve 136. Conduit 226 has fluid flow therethrough controlled by a relief valve 228 which is set at a pressure substantially higher than the relief pressure of the valve 136. The discharge side of relief valve 228 is connected by conduit 230 to the conduit 132. There is, moreover, provided an electrically operated flow controlling valve 232 in the conduit 132 and having solenoid controlled operating means 234 and including a solenoid 236, one end of which is connected by a conductor 238 with the negative line 142 and the other end of which is connected by a conductor 240 with the conductor 198. The valve 232 is of the normally open, magnetically closed type, and may desirably be of a balanced construction, and it will be observed that when the solenoid 236 is energized, venting past the pressure relief valve 136 will be interrupted and the only venting of fluid from the line 98 will have to be effected through the high pressure set relief valve 228. It will be noted that the solenoid 236 will be energized whenever the switch 208 is moved to contact with the contact element 204, which movement will take place whenever the propelling motor for the take-up buggy is energized to cause the take-up buggy to move toward the drive buggy. As a result of this arrangement the occurrence of slack in the belt as the take-up buggy is moving toward the drive buggy will be very effectually prevented since the movable cluster 42 will be pulled more strongly toward the right in Fig. 5.

It will be evident that supply of current to the solenoid 236 need not be under the control of the relay 192. Another suitable arrangement for effecting energization of the solenoid 236 when the take-up buggy is moved towards the drive buggy is illustrated in Fig. 7. In that figure, it will be observed that one end of the solenoid 236 is connected by a conductor 238' with the positive line 140 and the other end of the solenoid 236 is connected by a conductor 240' with the stationary contact 204, which is connectible by the movable switch element or contact 208 and conductor 210 with the negative line 142. Accordingly, it will be evident that when the control handle 214 for the take-up buggy driving motor means is actuated to effect movement of the take-up buggy towards the drive buggy, and the operative connection 224 moves the switch 208 into engagement with the contact 204, there will be established a circuit from the positive line 140, through conductor 238', solenoid 236, conductor 240', contact 204, switch 208 and conductor 210, to the negative line 142, and venting of pressure from the cylinder 78 will accordingly be possible only at the pressure determined by the high pressure set relief valve 228.

*Operation*

Except as otherwise noted, the following description is with respect to the arrangements shown in Figure 6. If movable contact 164 is engaged with fixed contact 166, drive motor 138 for pump 112 is connected for continuous operation of the pump. Thus closure of the switch 194, 200, 196 when the take-up buggy drive control element or handle 214 is moved to position R will not, in the position of switch 164 just mentioned, do any more with respect to pump driving motor 138 than establish a parallel power supply circuit to the solenoid 170 of the relay 148. There will, however, be effected a closure of the solenoid operated valve 232 by reason of the energization of the solenoid 236, which will then be in a closed circuit from the positive line 140 through conductors 176 and 180, contact 194, switch element 200, contact 196, conductor 240, solenoid 236 and conductor 238 to the negative line 142, and therefore, when the take-up buggy is driven in a direction to cause it to approach the drive buggy the pressure in the cylinder 78 will build up to and be maintained at a higher pressure than when the relief valve 136 was in control of such pressure.

If the movable contact 164 is engaged with the fixed contact 160, drive motor 138 will not be supplied with power unless the pressure switch 146 is closed, or unless the additional control means 192 be operated.

Let it be assumed that the pressure in pressure switch 146 is not low enough to cause contact 156 to contact with contact 158. Let it now be assumed that the motor controller 212 is moved into its reverse position, namely connecting the take-up buggy traction motor means 68 for movement of the take-up buggy toward the drive buggy.

With handle 214 moved to the right as seen in Fig. 6, interlock 224 simultaneously moves the movable contact 208 into engagement with the fixed contact 204. There is then a circuit established for the coil 201 as follows: positive line 140, conductors 176, 180 and 202, coil 201, conductor 206, fixed contact 204, movable contact 208, and conductor 210 to negative line 142.

With coil 201 energized, movable contact 200 moves into engagement with fixed contact 194 and 196, and establishes the following circuit for coil 170 of relay 148: positive line 140, conductors 176 and 180, fixed contact 194, movable contact 200, fixed contact 196, conductors 198, 172 and 168, coil 170, and conductor 174 to the negative line 142.

With coil 170 energized, a circuit for motor 138 is established as follows: positive line 140, conductors 176 and 178, fixed contact 182, movable contact 184, fixed contact 186, conductor 188, motor 138 and conductor 190 to negative line 142.

With motor 138 in operation, pump 112 is pumping fluid under pressure to the jack mechanism 80 by way of pressure line 108, sections 104, 102 and 100, and pressure line 98. Fluid is thereupon supplied to the cylinder 78 of the jack mechanism, extending the jack and moving the multiple blocks 84 and 86 apart to put tension in the cable 74 which is sufficient to move the moving carriage 42 to the right as seen in Figs. 2 and 5. As the carriage 42 thus moves to the right, it takes up the slack in the belt 6 which is provided by movement of take-up buggy 4 toward the drive buggy.

It will be evident that movement of controller handle 214 into the forward position has no effect on the hydraulic pump drive motor 138, because such movement, as schematically shown in Fig. 6, merely moves the contact 208 further away from contact 204.

As previously explained, it is desirable to have the pressure in the cylinder 78 increased during movement of approach of the take-up buggy towards the drive buggy, and this is automatically effected when the movable contact element 208 engages the stationary contact 204, as the solenoid 236 is then energized, to cause the valve device 232 to shut off fluid flow past it, by a circuit including the positive line 140, conductors 176 and 180, switches 194, 200, 196, a portion of conductor 198, conductor 240, solenoid 236, conductor 238 and negative line 142. Thus, the pressure in cylinder 78 will be determined by the setting of the higher pressure relief valve 228, and whenever the take-up buggy is approaching the drive buggy slack in the shortening sections of belt intermediate the take-up and drive buggies will be most effectively prevented.

It will be understood that the setting of relief valve 228 must not be higher than that of a relief valve built into section 104, or otherwise the latter valve section will determine the pressure in cylinder 78. No further description of the mode of operation of the modification of Fig. 7 seems necessary, as it will be clear from what was said where the structure was described.

From the foregoing it will be apparent to those skilled in the art that this invention provides a certain means for increasing the pressure which results from the operating of the hydraulic pump whenever the traction motor means of the take-up buggy is connected to move the take-up buggy toward the drive buggy. Other advantages will be apparent to those skilled in the art.

This application is at least a continuation of my co-pending application Serial No. 471,297, filed November 26, 1954 for Portable Extensible Conveyor, now abandoned.

While there is in this application specifically described one form and a modification which the invention may assume in practice, it will be understood that this form and modification of the same are shown for purposes of illustration and that the invention may be further modified and embodied in various other forms without departing from its spirit or the scope of the appended claims.

What is claimed is:

1. A belt conveyor comprising a pair of buggies each having means for engaging and supporting a conveyor belt and one having take-up means for a conveyor belt, the take-up means including a hydraulic cylinder and piston mechanism operative on fluid supply thereto to effect operation of the take-up means, a continuous conveyor belt carried by the belt engaging and supporting means and engaging the take-up means, means for supplying fluid to the cylinder and piston mechanism, relief valves respectively having lower and higher pressure settings associated with said hydraulic cylinder and piston mechanism and both adapted to have continuous communication with the latter and selectively operative to control the maximum pressure therein, means, including a stop valve at the downstream side of said relief valve having the lower pressure setting, for shifting control from the relief valve having the lower pressure setting to the one having the higher pressure setting, buggy driving means having control means therefor for effecting movement of approach between the buggies, and means controlled by the control means for respectively effecting fluid supply by the fluid supplying means to the cylinder and piston means whenever the control means is operated to effect such movement of approach and for concurrently effecting closure of said stop valve to place the relief valve with the higher pressure setting in control of the maximum pressure in said cylinder and piston mechanism.

2. An extensible belt conveyor comprising a pair of buggies each having means for engaging and supporting an endless conveyor belt and one of which has take-up means for a looped portion of said conveyor belt, said take-up means including a hydraulic mechanism operative on fluid supply thereto to effect operation of the take-up means, a hydraulic circuit for supplying fluid to said mechanism having means for controlling the pressure in said mechanism, buggy driving means having control means therefor for effecting movement of one of said buggies, and means connected to said hydraulic circuit the operation of which is controlled by the second mentioned control means for effecting an increase in said controlled pressure in said mechanism whenever the second mentioned control means is operated to effect movement of approach between said buggies.

3. An extensible belt conveyor comprising a pair of buggies each having means for engaging and supporting an endless conveyor belt and one of which has take-up means for a looped portion of said conveyor belt, said take-up means including a hydraulic mechanism operative on fluid supply thereto to effect operation of said take-up means, a hydraulic circuit for supplying fluid to said hydraulic mechanism having a first relief valve means therein for controlling the pressure in said hydraulic mechanism, a second relief valve having a higher setting than said first valve and hydraulically connected to the portion of said hydraulic circuit containing said first valve, buggy driving means having control means therefor for effecting movement of one of said buggies, and means connected to said hydraulic circuit controlled by the second mentioned control means for closing said portion of said hydraulic circuit whenever the second mentioned control means is operated to effect movement of approach between said buggies so that fluid can only flow through said second relief valve.

4. In an extensible belt conveyor comprising, a support having at least one roller, a take-up means movably supported by said support for alternative bodily movement in opposite directions with respect therewith and having at least one roller, said rollers being spaced from each other to receive a portion of an endless belt thereon, a mechanism including an element alternately movable in opposite directions connected to said take-up means to effect bodily movement thereof in one of said directions, a control circuit connected to said mechanism to effect movement of said movable element in said one direction, the improvement comprising an auxiliary control element and an auxiliary circuit having another control element therein which are connected to said control circuit to effect movement of said movable element at different rates when said element moves in said one direction.

5. In an extensible belt conveyor comprising, a support having at least one roller, take-up means movably supported by said support for alternative bodily movement in opposite directions with respect therewith and having at least one roller, said rollers being spaced from each other to receive a portion of an endless belt thereon, a mechanism including an element alternately movable in opposite directions connected to said take-up means to effect bodily movement thereof in one of said directions, a control circuit connected to said mechanism to effect such movement of said movable element in said one direction, the improvement comprising an auxiliary control element connected to said control circuit which has independently energizable operating means, said auxiliary control element being selectively operable from one position upon energization of said operating means to disrupt the continuity of a portion of said control circuit, and an auxiliary control circuit connected to the opposite ends of said portion of said control circuit having a control element therein to effect movement of said movable element at a different rate of speed than when said auxiliary control element is in said one position.

6. In an extensible belt conveyor comprising, a support having at least one roller, take-up means movably supported by said support for alternative bodily movement in opposite directions with respect therewith and having at least one roller, said rollers being spaced from each other to receive a portion of an endless belt thereon, a mechanism including an element alternately movable in opposite directions connected to said take-up means to effect bodily movement thereof in one of said directions, a hydraulic control circuit connected to said mechanism to effect movement of said movable element in said one direction, an electrical control circuit for controlling energization of said hydraulic control circuit, the improvement comprising an auxiliary control element connected to said hydraulic control circuit which has operating means energized by said electrical control circuit, said auxiliary control element being selectively operable from one position upon energization of said operating means to close a portion of said hydraulic control circuit, and an auxiliary hydraulic control circuit hydraulically connected to the opposite ends of said portion of said first mentioned hydraulic control circuit having a relief valve therein to effect movement of said movable element at a different rate of speed than when said auxiliary control element is in said one position.

7. A control circuit for a power output device which maintains tension in an endless conveyor belt having a looped portion engaged by movable means which is moved by the power output device whereby the conveying length of the belt is varied comprising, a normally deenergized first circuit having a first electrically energizable control means therein for controlling the energization of a normally deenergized second circuit which is adapted to be connected to said power output device to obtain operation thereof when said second circuit is energized, said first circuit having a control portion with a second control means therein which is movable into circuit making and breaking position for said first circuit, a normally deenergized third circuit connected to said first circuit to shunt said control portion thereof, a normally deenergized fourth circuit having a third control means therein for controlling the energization of said third circuit, a manually operable control means having at least one position to energize said fourth circuit whereby said third and first control means are energized regardless of the position of said second control means, a fifth circuit connected to said third circuit so as to be energized only when said third circuit is energized, and a fourth control means operable upon energization of said fifth circuit to vary the force for obtaining movement of said movable means.

8. A control circuit for a power output device which maintains tension in an endless conveyor belt having a looped portion engaged by movable means which is moved by the power output device whereby the conveying length of the belt is varied comprising, a normally deenergized first circuit having a first electrically energizable control means therein for controlling the energization of a normally deenergized second circuit which is adapted to be connected to said power output device to obtain operation thereof when said second circuit is energized, said first circuit having switching means therein which is movable into circuit making and breaking position for said first circuit, a normally deenergized third circuit connected to said first circuit to shunt said switching means, a normally deenergized fourth circuit having a second electrically energizable control means therein for controlling the energization of said third circuit, a manually operable multiple position controller having a reverse position electrically connected to energize said fourth circuit whereby said second and first control means are energized regardless of the position of said switching means, a fifth circuit connected so as to be energized only when said third circuit is energized, and a third control means operable upon energization of said fifth circuit to vary the force for obtaining movement of said movable means.

References Cited in the file of this patent

UNITED STATES PATENTS 2,265,800     Connor et al. _____ Dec. 9, 1941